June 26, 1928.
K. E. PEILER
1,674,794
LEER CONVEYER AND DRIVING MECHANISM
Filed Feb. 12, 1927 2 Sheets-Sheet 1
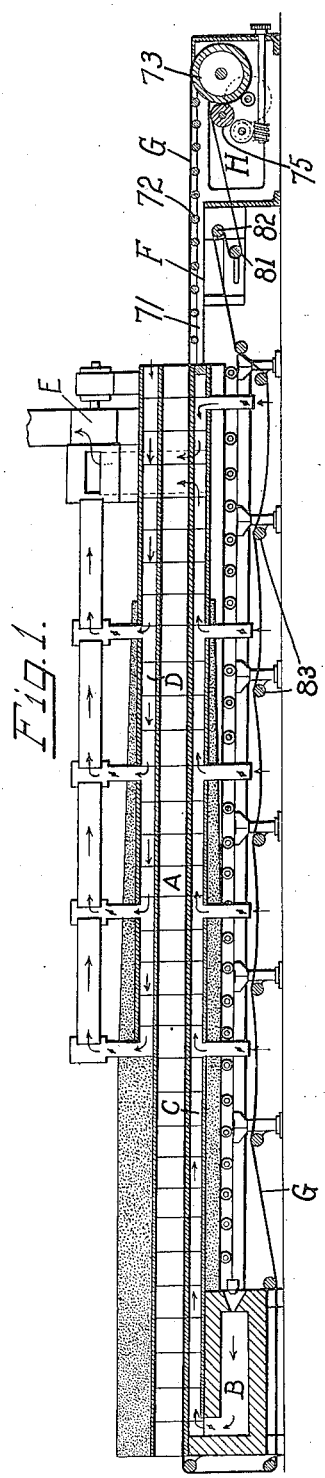
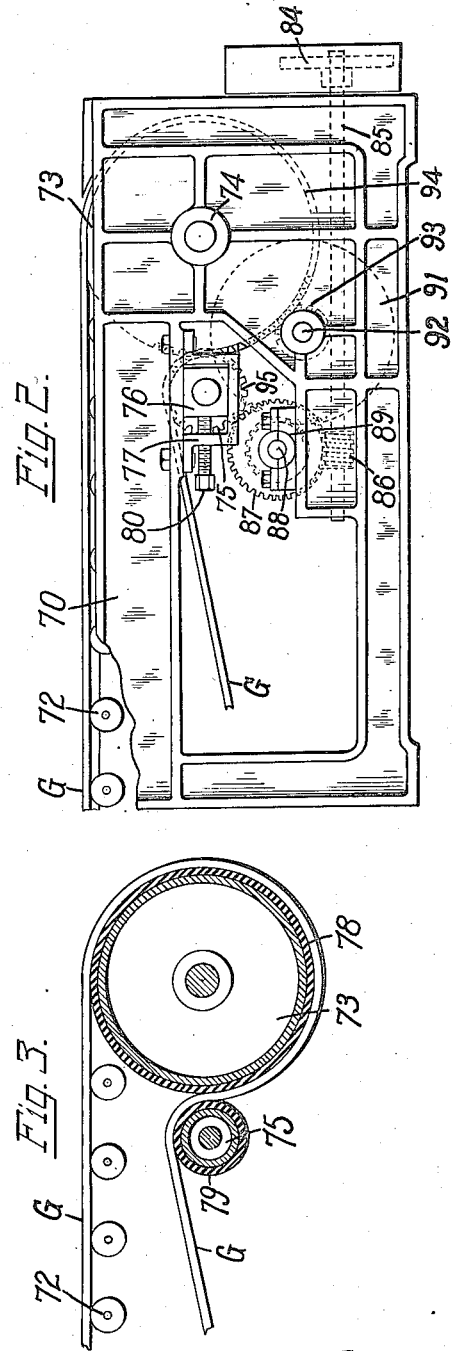
Inventor
Karl E. Peiler
by Robert S. Brown
Attorney June 26, 1928.
K. E. PEILER
1,674,794
LEER CONVEYER AND DRIVING MECHANISM
Filed Feb. 12, 1927    2 Sheets-Sheet 2
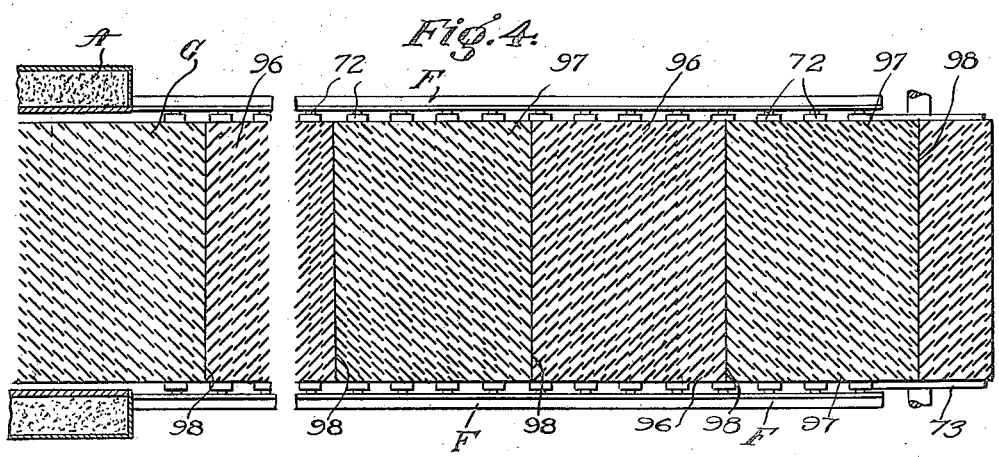
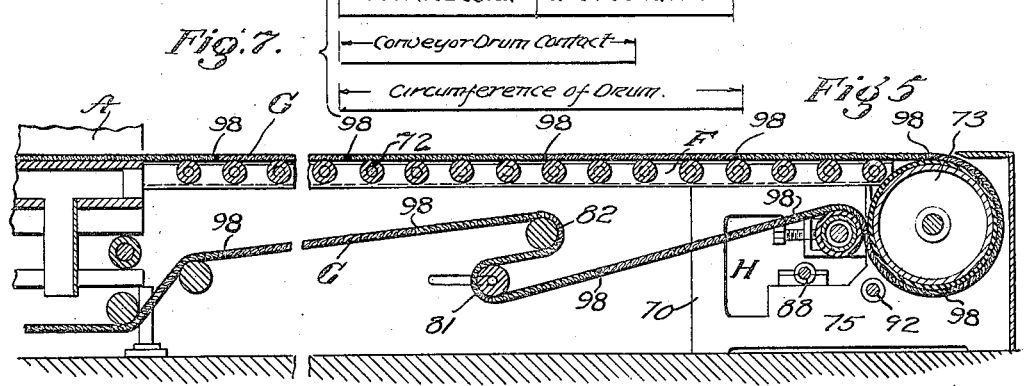
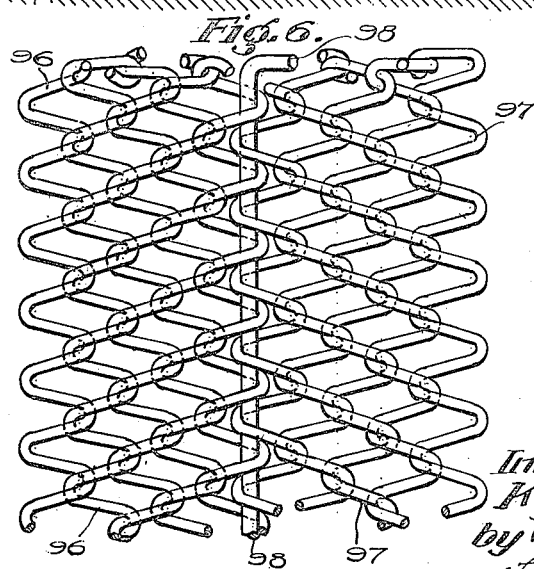

Patented June 26, 1928.

1,674,794

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

LEER CONVEYER AND DRIVING MECHANISM.

Application filed February 12, 1927. Serial No. 167,659.

This invention relates to apparatus for annealing glassware, and it has particular relation to leers of the type embodying a tunnel through which ware is transported by an endless conveyer of woven wire fabric and in which the ware is subjected to suitable temperature environments in order to first relieve stresses and strains existing therein and then to cool the ware at a rate at which additional strains will not develop. Such an apparatus is disclosed in the Mulholland Patent No. 1,560,481 of the Hartford-Empire Company, dated November 3, 1925.

In glass annealing leers embodying an endless belt conveyer which is composed of woven wire fabric arranged in alternate sections of right and left-hand wound wire helixes and which is driven by a driving mechanism such as that disclosed in the patent to Ingle No. 1,583,046, which includes a roller of relatively small diameter over which the ware-bearing strand of the conveyer initially passes at the exit end of the tunnel, the helically wound wires which compose the mesh of the conveyer, exert a decided screw action in the direction of their convolutions as they twist relative to each other in adapting themselves to the curve of the roller at the line of tangency of the plane of the ware bearing strand of the conveyer and the drum. This is by reason of the fact that as soon as one of the helixes frictionally engages the drum, its lateral position becomes fixed, but as it turns in taking the curve of the drum, it exerts a screw action on the next succeeding helix and moves it laterally on its support to a position in which it will follow onto the drum slightly offset with respect to the preceding helix. This offset position of the succeeding helix will also become fixed as soon as it engages the drum and will, in turn, exert a similar screw action on the next succeeding helix with the result that the ware-bearing strand of the conveyer will creep laterally on its support a distance in proportion to the number of helixes of the same pitch passing onto the drum. This screw action of the helixes of the belt increases as the radius of the roller decreases, with the result that with a small drum or roller there is an increased tendency for the conveyer to creep laterally during the operation of the leer and to drag against a side of the tunnel or conveyer guide and to become damaged through contact therewith.

One of the objects of the present invention is to avoid the difficulties above mentioned by providing a driving mechanism for a conveyer of the type described, which includes a drum arranged at the exit of the tunnel and over which the ware-bearing strand of the conveyer initially passes at the completion of its active travel, this drum having a radius sufficiently great to prevent the turning or twisting movement of the spirals of one section relative to each other, from causing the conveyers to creep laterally in one direction, a distance greater than the difference between the width of the conveyer and its support before the oppositely wound helixes of the next succeeding section, in passing upon the drum, causes the conveyer to creep laterally in the opposite direction.

Other objects of the invention will appear from the following description and appended claims.

In the accompanying drawings:

Figure 1 is a diagrammatic vertical longitudinal sectional view of a leer constructed according to the invention;

Fig. 2 is a side elevational view of the conveyer driving mechanism;

Fig. 3 is a diagrammatic vertical longitudinal sectional view through the driving drum and the binding roller;

Fig. 4 is a plan view of the conveyer and driving roll and illustrates the relation between the width of the conveyer, the width and diameter of the driving roll, and the width of the supporting rolls and that of the tunnel, and also the length of the sections of the conveyer;

Fig. 5 is a side elevational view of the structure shown in Fig. 4 and illustrates the relation between the diameter of the driving roll and the width of the sections of the conveyer, and also the position of the gripping roll relative to the point of tangency between the ware bearing strand of the conveyer and the driving roll;

Fig. 6 is a fragmentary view on an enlarged scale showing the pitch of the interconnected helixes of adjacent sections of the conveyer, and Fig. 7 is a diagram illustrating the relative proportions of the sections of the conveyer, the circumference of the drum and the amount of the conveyer in contact therewith.

Referring to the drawings, the invention is diagrammatically illustrated in Figure 1 as comprising a sectional tunnel A; a fire box B, located beneath the forward or ware-receiving end of the tunnel; a plurality of heating flues C communicating with the fire box and extending longitudinally beneath the tunnel; a plurality of cooling flues D, extending longitudinally above the tunnel; a draft-producing device E, specifically a suction fan, located at the exit end of the tunnel and communicating with both the heating flues and the cooling flues; a ware-sorting table F, located at the exit end of the tunnel; an endless conveyer G, of openwork or wire mesh fabric, the ware-bearing strand of which traverses the tunnel and the sorting table F, and the idle strand of which returns to the exit end of the tunnel beneath the leer; and a conveyer driving mechanism H.

The conveyer driving mechanism H, which is the subject of the present invention, is mounted in a frame 70, which also constitutes a support for the frame 71 of the sorting table F. The conveyer G, as it emerges from the tunnel, traverses the table F where it is supported by a plurality of spaced rollers 72. Upon reaching the end of the sorting table, the conveyer first passes over a driving drum 73 which has a relatively great radius and which is journaled in bearings 74 in the frame 70, and thence upwardly and around a binding roller 75 which is journaled at its ends in slide boxes 76, mounted in ways 77. The drum 73 and the roller 75 are provided with resilient anti-slipping coverings 78 and 79 respectively, of rubber or the like, for yielding engagement with the texture of the fabric of the conveyer. The roller 75 is urged toward the drum 73 by means of jack screws 80, which are threaded in the ways 77 and which bear against the slide boxes 76, thus securely gripping the conveyer between the drum and the roller (Fig. 3). The roller 75 is arranged so that it maintains the conveyer in engagement with a major portion of the periphery of the drum 73, thus materially increasing the area of contact between the conveyer and the drum and the degree of friction therebetween.

After passing over the roller 75 the conveyer passes forwardly and beneath an idle roller 81, and thence upwardly and rearwardly over a roller 82. After leaving the roller 82, the conveyer belt G passes beneath the leer tunnel, where it is supported at intervals by rollers 83 which are mounted on the pedestals which support the leer tunnel.

The drum 73 and the binding roller 75 are rotated by a sprocket wheel 84, which is driven in any preferred manner. The sprocket wheel 84 is mounted on a shaft 85 which carries a worm 86 meshing with a worm wheel 87 carried by a shaft 88. A pinion 89 is also fixed to the shaft 88 and meshes with a gear wheel 91 mounted on a shaft 92. A pinion 93 is also keyed to the shaft 92 and meshes with a gear wheel 94 fixed to the drum 73. The gear wheel 94 also meshes with a gear wheel 95 fixed to the roller 75, whereby both the drum and the roller are driven at the same peripheral speed.

The conveyer comprises a series of sections 96 and 97 connected by straight wires 98. Each of the sections is composed of interconnected wire helixes, the helixes of adjacent sections being wound in opposite directions (Figs. 4 and 6). From an inspection of Figs. 4, 5 and 7, it will be observed that the length of the sections bears such a relation to that portion of the surface of the drum, with which the conveyer is in contact, that both a right and a left-hand woven section is always in contact with the drum. Also, by reference to the figures mentioned, it will be noted that the width of the conveyer bears such a relation to that of the support, namely, the bottom of the tunnel A and the rollers 72, and the length of the drums 73 that one section of the conveyer passing on to the drum will not cause the conveyer to creep laterally an excessive distance before the next succeeding and oppositely woven section engages the drum and causes the conveyer to creep laterally in the opposite direction. It will be understood that the pitch of the helixes is such that excess creeping in one direction will not occur before the next succeeding section counteracts this action.

It will be apparent from the foregoing that a very rugged and positive driving mechanism is provided for a conveyer of the woven wire type and one that will decrease the amount of turning or corkscrew movement of the helically wound wires of which the conveyer is composed, thus materially decreasing the tendency for the conveyer to creep laterally as it passes upon the driving drum.

The invention may be modified in construction and arrangement, without departing from the scope of the invention as set forth in the appended claims.

I claim as my invention:

1. Apparatus for annealing glassware, comprising a tunnel, a laterally and longitudinally flexible endless conveyer for transporting articles of glassware through said tunnel, said conveyer having an active or ware-bearing strand extending through said tunnel and also having an idle strand returning to the entrance end of said tunnel, said conveyer comprising alternately arranged sections of right and left-hand wound interconnected wire helixes, a drum which said conveyer initially and frictionally engages at the termination of its active or ware-bearing travel, with a resulting tendency for the successive helically wound wires of each section to be led thereonto laterally offset relative to each other by the twisting or corkscrew action of said wires in conforming to the curvature of said drum, the said drum having a radius sufficiently great to prevent such relative twisting or corkscrew action from causing the section engaging said drum to creep laterally thereon an excessive degree in one direction before the oppositely wound helical wires of the next succeeding section in passing upon said drum, cause said conveyer to creep laterally in the opposite direction.

2. Apparatus for annealing glassware, comprising a tunnel, a laterally and longitudinally flexible endless conveyer for transporting articles of glassware through said tunnel, said conveyer having a width less than that of said tunnel and consisting of alternately arranged sections of right and left-hand wound interconnected wire helixes, a driving drum disposed adjacent to the exit end of said tunnel and which said conveyer initially and frictionally engages at the termination of its active or ware-bearing travel, with a resulting tendency for the successive helically wound wires of each section to creep laterally by a relative twisting or screwing action in conforming to the curvature of said drum, the said drum having a radius sufficiently great to prevent such relative twisting action from causing said conveyer to creep laterally in said tunnel an excessive degree in one direction before the oppositely wound helical wires of the next succeeding section, in passing onto said drum, cause said conveyer to creep laterally in the opposite direction.

3. Apparatus for annealing glassware, comprising a tunnel, a laterally and longitudinally flexible endless conveyer for transporting articles of glassware through said tunnel, said conveyer having an active or ware-bearing strand extending through said tunnel and also having an idle strand returning to the entrance end of said tunnel, said conveyer comprising alternately arranged sections of right and left-hand wound interconnected wire helixes, a drum which said conveyer initially and frictionally engages at the termination of its active or ware-bearing travel, with a resulting tendency for the successive helically wound wires of each section to be led thereonto laterally offset relative to each other by the twisting or corkscrew action of said wires in conforming to the curvature of said drum, the said drum having a radius sufficiently great to prevent such relative twisting or corkscrew action from causing the section engaging said drum to creep laterally thereon an excessive degree in one direction before the oppositely wound helical wires of the next succeeding section in passing upon said drum cause said conveyer to creep laterally in the opposite direction, and a roller associated with said drum for gripping the conveyer therebetween, whereby the ware-bearing strand of said conveyer is maintained under tension and the idle strand thereof relatively slack.

4. Apparatus for annealing glassware, comprising a tunnel, a laterally and longitudinally flexible endless conveyer for transporting articles of glassware through said tunnel, said conveyer having an active or ware-bearing strand extending through said tunnel and also having an idle strand returning to the entrance end of said tunnel, said conveyer comprising alternately arranged sections of right and left-hand wound interconnected wire helixes, a drum which said conveyer initially and frictionally engages at the termination of its active or ware-bearing travel, with a resulting tendency for the successive helically wound wires of each section to be led thereonto laterally offset relative to each other by the twisting or corkscrew action of said wires in conforming to the curvature of said drum, the said drum having a radius sufficiently great to prevent such relative twisting or corkscrew action from causing the section engaging said drum to creep laterally thereon an excessive degree in one direction before the oppositely wound helical wires of the next succeeding section in passing upon said drum, cause said conveyer to creep laterally in the opposite direction, and a roller for maintaining said conveyer in contact with said drum throughout a major portion of the periphery thereof.

5. Apparatus for annealing glassware, comprising a tunnel; a laterally and longitudinally flexible endless conveyer for transporting articles of glassware through said tunnel, said conveyer having an active or ware-bearing strand extending through said tunnel and also having an idle or return strand, said conveyer comprising alternately arranged sections of right and left-hand wound interconnected wire helixes; means for providing a support for the ware-bearing strand of said conveyer throughout the entire width thereof and over which the ware-bearing strand of said conveyer passes, said support having a width in excess of that of said conveyer; and a drum which said conveyer initially and frictionally engages at the termination of its active or ware-bearing travel, with a resulting tendency for the successive helically wound wires of each section to creep laterally by a relative twisting or corkscrew action in conforming to the curvature of said drum, the said drum having a radius sufficiently great to prevent such relative twisting or corkscrew action from causing the section engaging said drum to creep laterally a distance greater than the difference between the width of said support and that of said conveyer, before the oppositely wound helical wires of the next succeeding section, in passing upon said drum, cause said conveyer to creep laterally in the opposite direction.

6. Apparatus for annealing glassware, comprising a tunnel; a laterally and longitudinally flexible endless conveyer for transporting articles of glassware through said tunnel, said conveyer having an active or ware-bearing strand extending through said tunnel and also having an idle or return strand, said conveyer comprising alternately arranged sections of right and left-hand wound interconnected wire helixes; means for providing a support for said conveyer throughout the entire width thereof and over which the ware-bearing strand of said conveyer passes, said support having a width in excess of that of said conveyer; and a drum which said conveyer initially and frictionally engages at the termination of its active or ware-bearing travel, with a resulting tendency for the successive helically wound wires of each section to creep laterally by a relative twisting or corkscrew action in conforming to the curvature of said drum, the said drum having a radius sufficiently great to prevent such relative twisting or corkscrew action from causing the section engaging said drum to creep laterally a distance greater than one-half the difference between the width of said support and that of said conveyer, before the oppositely wound helical wires of the next succeeding section, in passing upon said drum, cause said conveyer to creep laterally in the opposite direction.

7. Apparatus for annealing glassware, comprising a tunnel; a laterally and longitudinally flexible endless conveyer for transporting articles of glassware through said tunnel, said conveyer having an active or ware-bearing strand extending through said tunnel and also having an idle or return strand, said conveyer comprising alternately arranged sections of right and left-hand wound interconnected wire helixes; means for providing a support for said conveyer throughout the entire width thereof and over which the ware-bearing strand of said conveyer passes, said support having a width in excess of that of said conveyer; and a drum which said conveyer initially and frictionally engages at the termination of its active or ware-bearing travel, with a resulting tendency for the successive helically wound wires of each section to creep laterally by a relative twisting or corkscrew action in conforming to the curvature of said drum, the said drum having a radius sufficiently great to prevent such relative twisting or corkscrew action from causing the section engaging said drum to creep laterally excessively in one direction before the oppositely wound helical wires of the next succeeding section, in passing upon said drum, cause said conveyer to creep laterally in the opposite direction.

8. Apparatus for annealing glassware, comprising a tunnel; a laterally and longitudinally flexible endless conveyer for transporting articles of glassware through said tunnel, said conveyer having an active or ware-bearing strand extending through said tunnel and also having an idle or return strand, said conveyer comprising alternately arranged sections of right and left-hand wound interconnected wire helixes; means for providing a support for said conveyer throughout the entire width thereof and over which the ware-bearing strand of said conveyer passes, said support having a width in excess of that of said conveyer; and a drum which said conveyer initially and frictionally engages at the termination of its active or ware-bearing travel, with a resulting tendency for the successive helically wound wires of each section to creep laterally by a relative twisting or corkscrew action in conforming to the curvature of said drum, the said drum having a periphery sufficiently great in comparison to the length of said sections to prevent such relative twisting or corkscrew action from causing the section engaging said drum to creep laterally a distance greater than the difference between the width of said support and that of said conveyer, before the oppositely wound helical wires of the next succeeding section, in passing upon said drum, cause said conveyer to creep laterally in the opposite direction.

9. Apparatus for annealing glassware, comprising a tunnel; a laterally and longitudinally flexible endless conveyer for transporting articles of glassware through said tunnel, said conveyer having an active or ware-bearing strand extending through said tunnel and also having an idle or return strand, said conveyer comprising alternately arranged sections of right and left-hand wound interconnected wire helixes; means for providing a support for said conveyer throughout the entire width thereof and over which the ware-bearing strand of said conveyer passes, said support having a width in excess of that of said conveyer; and a drum which said conveyer initially and frictionally engages at the termination of its active or ware-bearing travel, with a resulting tendency for the successive helically wound wires of each section to creep laterally by a relative twisting or corkscrew action in conforming to the curvature of said drum, the said drum having a radius sufficiently great in comparison to the pitch of said helically wound wires to prevent such relative twisting or corkscrew action from causing the section engaging said drum to creep laterally a distance greater than the difference between the width of said support and that of said conveyer, before the oppositely wound helical wires of the next succeeding section, in passing upon said drum, cause said conveyer to creep laterally in the opposite direction.

10. Apparatus for annealing glassware, comprising a tunnel; a laterally and longitudinally flexible endless conveyer for transporting articles of glassware through said tunnel, said conveyer having an active or ware-bearing strand extending through said tunnel and also having an idle or return strand, said conveyer comprising alternately arranged sections of right and left-hand wound interconnected wire helixes; means for providing a support for said conveyer throughout the entire width thereof and upon which the ware-bearing strand of said conveyer is slidably mounted, said support having a width in excess of that of said conveyer; and a drum which said conveyer initially and frictionally engages at the termination of its active or ware-bearing travel, with a resulting tendency for the successive helically wound wires of each section to creep laterally by a relative twisting or corkscrew action in conforming to the curvature of said drum, the said drum having a radius sufficiently great to prevent such relative twisting or corkscrew action from causing the section engaging said drum to creep laterally a distance greater than the difference between the width of said support and that of said conveyer, before the oppositely wound helical wires of the next succeeding section, in passing upon said drum, cause said conveyer to creep laterally in the opposite direction.

11. Apparatus for annealing glassware, comprising a tunnel, a laterally and longitudinally flexible endless conveyer for transporting articles of glassware through said tunnel, said conveyer having an active or ware-bearing strand extending through said tunnel and also having an idle strand returning to the entrance end of said tunnel, said conveyer comprising alternately arranged sections of right and left-hand wound interconnected wire helixes, a drum which said conveyer initially and frictionally engages at the termination of its active or ware-bearing travel, with a resulting tendency for the successive helically wound wires of each section to be led thereonto laterally offset relative to each other by the twisting or corkscrew action of said wires in conforming to the curvature of said drum, the said drum having a radius sufficiently great to prevent such relative twisting or corkscrew action from causing the section engaging said drum to creep laterally thereon an excesive degree in one direction before the oppositely wound helical wires of the next succeeding section in passing upon said drum, cause said conveyer to creep laterally in the opposite direction, and a roller arranged to engage the ware supporting surface of said conveyer for maintaining said conveyer in contact with said drum throughout a major portion of the periphery thereof.

Signed at Hartford, Connecticut this 21st day of January, 1927.

KARL E. PEILER.